United States Patent
Park et al.

(10) Patent No.: US 9,575,785 B2
(45) Date of Patent: Feb. 21, 2017

(54) CLUSTER SYSTEM AND METHOD FOR PROVIDING SERVICE AVAILABILITY IN CLUSTER SYSTEM

(71) Applicant: SAMSUNG SDS CO., LTD., Seoul (KR)

(72) Inventors: Seong-Mi Park, Seoul (KR); Kwang-Hyun Lee, Seoul (KR); Kwang-Min Choi, Yongin-si (KR)

(73) Assignee: SAMSUNG SDS CO., LTD., Seoul (KR)

(*) Notice: Subject to any disclaimer, the term of this patent is extended or adjusted under 35 U.S.C. 154(b) by 220 days.

(21) Appl. No.: 14/481,444

(22) Filed: Sep. 9, 2014

(65) Prior Publication Data

US 2015/0074447 A1 Mar. 12, 2015

(30) Foreign Application Priority Data

Sep. 9, 2013 (KR) .................... 10-2013-0108007

(51) Int. Cl.
  *G06F 11/14* (2006.01)
  *G06F 11/30* (2006.01)
  *G06F 11/20* (2006.01)
  *G06F 9/455* (2006.01)
  *G06F 9/445* (2006.01)

(52) U.S. Cl.
  CPC ....... *G06F 9/45533* (2013.01); *G06F 9/45558* (2013.01); *G06F 11/1425* (2013.01); *G06F 11/1484* (2013.01); *G06F 11/20* (2013.01); *G06F 11/2023* (2013.01); *G06F 11/2028* (2013.01); *G06F 11/2035* (2013.01);
(Continued)

(58) Field of Classification Search
  CPC .............. G06F 11/1484; G06F 11/2023; G06F 11/2028
  See application file for complete search history.

(56) References Cited

U.S. PATENT DOCUMENTS 8,032,780 B2 * 10/2011 Koh ........................ H04L 41/06
                                                    714/4.11
8,984,123 B2 *  3/2015 Machida ............. G06F 11/1438
                                                    709/216
(Continued)

FOREIGN PATENT DOCUMENTS

KR    10-0832543 B1    5/2008
KR    10-2008-0051040 A    6/2008

*Primary Examiner* — Albert Decady
*Assistant Examiner* — Paul Contino
(74) *Attorney, Agent, or Firm* — Sughrue Mion, PLLC (57) ABSTRACT

A cluster system and a method for providing service availability. The cluster system includes a first physical server having registered therein an active virtual machine; and a plurality of physical servers, wherein the plurality of physical servers comprises a second physical server having registered therein a standby virtual machine corresponding to the active virtual machine, the active virtual machine failing over to the standby virtual machine when a failure occurs in the first physical server, wherein each of the plurality of physical servers stores post-failure registration information when the failure occurs, wherein the post-failure registration information associates the active virtual machine with a physical server among the plurality of physical servers, and wherein the physical server is different from the second physical server.

24 Claims, 3 Drawing Sheets

(52) U.S. Cl.
CPC .......... *G06F 11/301* (2013.01); *G06F 9/445* (2013.01); *G06F 11/203* (2013.01); *G06F 2009/45575* (2013.01)

(56) References Cited

U.S. PATENT DOCUMENTS

| | | | | |
|---|---|---|---|---|
| 9,354,927 | B2* | 5/2016 | Hiltgen | G06F 9/485 |
| 2006/0155912 | A1* | 7/2006 | Singh | G06F 9/5088 |
| | | | | 711/6 |
| 2011/0022574 | A1* | 1/2011 | Hansen | G06F 11/2097 |
| | | | | 707/698 |
| 2011/0214005 | A1* | 9/2011 | Biran | G06F 11/008 |
| | | | | 714/1 |
| 2013/0054807 | A1* | 2/2013 | Sherwood | H04L 67/1095 |
| | | | | 709/226 |
| 2014/0123138 | A1* | 5/2014 | Lee | G06F 9/45558 |
| | | | | 718/1 |
| 2014/0165056 | A1* | 6/2014 | Ghai | G06F 12/0891 |
| | | | | 718/1 |
| 2014/0215172 | A1* | 7/2014 | Tsirkin | G06F 11/203 |
| | | | | 711/162 |
| 2016/0285734 | A1* | 9/2016 | Dempo | H04L 45/02 |

* cited by examiner

CLUSTER SYSTEM AND METHOD FOR PROVIDING SERVICE AVAILABILITY IN CLUSTER SYSTEM

CROSS-REFERENCE TO RELATED APPLICATION

This application claims priority to and the benefit of Korean Patent Application No. 2013-0108007, filed on Sep. 9, 2013, the disclosure of which is incorporated herein by reference in its entirety.

BACKGROUND

1. Field

The present disclosure relates to a technique for providing service availability in a cluster system, and more particularly, to a method for providing, based on a virtualized environment, a high level of service availability in a cluster system and to such a cluster system.

2. Discussion of Related Art

A variety of high availability (HA) technologies exist for reducing downtime during which a service is not available due to a physical failure in a computing environment for providing the service. For example, a cluster system, which includes several server computers that are communicatively connected to one another, provides an active server for offering a certain service and a standby server for resuming the service when the active server fails.

While, as described above, the standby server performs a failover upon the occurrence of a failure in the active server, an administrator of the system may understand what causes the failure of the active server in order to restore the active server or replace the active server with a new server.

SUMMARY

With the above-described HA technology for dualization of an active server with a standby server, when a failure has occurred in the standby server, and when, before an administrator takes an action for the failure, the active server also fails, the service that has been provided by the active server may be discontinued.

In addition, if information indicating the dualization is not correct, the standby server may not perform a proper failover upon the occurrence of a failure in the active server.

The present disclosure provides techniques by which a cluster system including a plurality of physical servers may provide, based on a virtualized environment, a high level of service availability, enables a pair of an active virtual machine and a standby virtual machine corresponding to the active virtual machine to exist even when any physical server fails in the cluster system, and facilitates updating, based on available resources of the physical server, information indicating the pair.

According to an exemplary embodiment, there is provided a cluster system including: a first physical server having registered therein an active virtual machine; and a plurality of physical servers, wherein the plurality of physical servers includes a second physical server having registered therein a standby virtual machine corresponding to the active virtual machine, the active virtual machine failing over to the standby virtual machine when a failure occurs in the first physical server, wherein each of the plurality of physical servers stores post-failure registration information when the failure occurs, wherein the post-failure registration information associates the active virtual machine with a physical server among the plurality of physical servers, and wherein the physical server is different from the second physical server.

Based on an available resource of each of physical servers which are different from the second physical server and are included in the plurality of physical servers, the physical server may be selected from among the physical servers different from the second physical server for configuration of the post-failure registration information.

The active virtual machine may be registered in the physical server according to the post-failure registration information.

The post-failure registration information may associate another standby virtual machine registered in the first physical server with another physical server among the plurality of physical servers, and said another physical server may be different from a physical server having registered therein another active virtual machine corresponding to said another standby virtual machine.

Based on an available resource of each of physical servers which are different from the physical server having registered therein said another active virtual machine and are included in the plurality of physical server, said another physical server may be selected from among the physical servers different from the physical server having registered therein said another active virtual machine for configuration of the post-failure registration information.

Said another standby virtual machine may be registered in said another physical server according to the post-failure registration information.

Each of the first physical server and the plurality of physical servers may store pre-failure registration information before the failure occurs, the post-failure registration information may be configured by updating of the pre-failure registration information, and the pre-failure registration information may indicate a virtual machine which is registered in each of the first physical server and the plurality of physical servers before the failure occurs.

Before the failure occurs, the pre-failure registration information may be changeable based on a state of each of the first physical server and the plurality of physical servers.

The pre-failure registration information may further indicate an available resource of the first physical server and an available resource of each of the plurality of physical servers.

The pre-failure registration information may be changed when an amount of variation in at least one of the available resource of the first physical server and the available resource of each of the plurality of physical servers is greater than a threshold.

According to another exemplary embodiment, there is provided a method of providing service availability in a cluster system, the method including: when a failure occurs in a first physical server having registered therein an active virtual machine, allowing the active virtual machine to fail over to a standby virtual machine corresponding to the active virtual machine, the standby virtual machine being registered in a second physical server among a plurality of physical servers; and when the failure occurs, storing post-failure registration information in each of the plurality of physical servers, wherein the post-failure registration information associates the active virtual machine with a physical server among the plurality of physical servers, and wherein the physical server is different from the second physical server.

The method may further include selecting, based on an available resource of each of physical servers which are different from the second physical server and are included in the plurality of physical servers, the physical server from among the physical servers different from the second physical server for configuration of the post-failure registration information.

The method may further include registering the active virtual machine in the physical server according to the post-failure registration information.

The post-failure registration information may associate another standby virtual machine registered in the first physical server with another physical server among the plurality of physical servers, and said another physical server may be different from a physical server having registered therein another active virtual machine corresponding to said another standby virtual machine.

The method may further include selecting, based on an available resource of each of physical servers which are different from the physical server having registered therein said another active virtual machine and are included in the plurality of physical server, said another physical server from among the physical servers different from the physical server having registered therein said another active virtual machine for configuration of the post-failure registration information.

The method may further include registering said another standby virtual machine in said another physical server according to the post-failure registration information.

The method may further include further comprising: storing pre-failure registration information in each of the first physical server and the plurality of physical servers before the failure occurs; and configuring the post-failure registration information by updating the pre-failure registration information, and the pre-failure registration information may indicate a virtual machine which is registered in each of the first physical server and the plurality of physical servers before the failure occurs.

The method may further include changing, before the failure occurs, the pre-failure registration information based on a state of each of the first physical server and the plurality of physical servers.

The pre-failure registration information may further indicate an available resource of the first physical server and an available resource of each of the plurality of physical servers.

The pre-failure registration information may be changed when an amount of variation in at least one of the available resource of the first physical server and the available resource of each of the plurality of physical servers is greater than a threshold.

According to still another exemplary embodiment, there is provided a server computer including: a processor; and a memory, wherein the memory includes: registration information indicating a virtual machine registered in each of another server computer and a plurality of server computers including the server computer; a standby virtual machine corresponding to an active virtual machine registered in said another server computer; and computer-executable instructions configured to, when executed by the processor, perform: an operation of allowing, in response to determining that a failure has occurred in said another server computer, the active virtual machine to fail over to the standby virtual machine; and an operation of updating the registration information in response to the determination, and wherein the updated registration information associates the active virtual machine with one of the plurality of server computers, and wherein said one of the plurality of server computers is different from the server computer.

The computer-executable instructions may be further configured to, when executed by the processor, perform an operation of selecting, based on an available resource of each of server computers which are different from the server computer and are included in the plurality of server computers, said one of the plurality of server computers from among the server computers different from the server computer for updating of the registration information.

Said another server computer may have registered therein another standby virtual machine, the updated registration information may associate said another standby virtual machine with another one of the plurality of server computers, and said another one of the plurality of server computers may be different from a server computer having registered therein another active virtual machine corresponding to said another standby virtual machine.

The computer-executable instructions may be further configured to, when executed by the processor, perform an operation of selecting, based on an available resource of each of server computers which are different from the server computer having registered therein said another active virtual machine and are included in the plurality of server computers, said another server computer from among the server computers different from the server computer having registered therein said another active virtual machine for updating of the registration information.

The computer-executable instructions may be further configured to, when executed by the processor, perform an operation of changing, before the failure occurs, the registration information based on a state of each of the plurality of server computers and a state of said another server computer.

The registration information may further indicate an available resource of said another server computer and an available resource of each of the plurality of server computers.

The operation of changing the registration information may be performed when an amount of variation in at least one of the available resource of each of the plurality of server computers and the available resource of said another server computer is greater than a threshold.

BRIEF DESCRIPTION OF THE DRAWINGS

The above and other objects, features, and advantages of the present disclosure will become more apparent to those familiar with this field from the following detailed description when taken in conjunction with the accompanying drawings, in which.

DETAILED DESCRIPTION OF EXEMPLARY EMBODIMENTS

Hereinafter, detailed embodiments of the present disclosure will be described with reference to drawings. However, the embodiments are merely examples and are not to be construed as limiting the present disclosure.

Various details already understood by those familiar with this field will be omitted to avoid obscuring the gist of the present disclosure. Terminology described below is defined considering functions in the present disclosure and may vary according to a user's or operator's intention or usual practice. Thus, the meanings of the terminology should be interpreted based on the overall context of the present specification.

The spirit of the present disclosure is determined by the claims, and the following exemplary embodiments are provided only to efficiently describe the spirit of the present disclosure to those familiar with this field.

Figure 1:
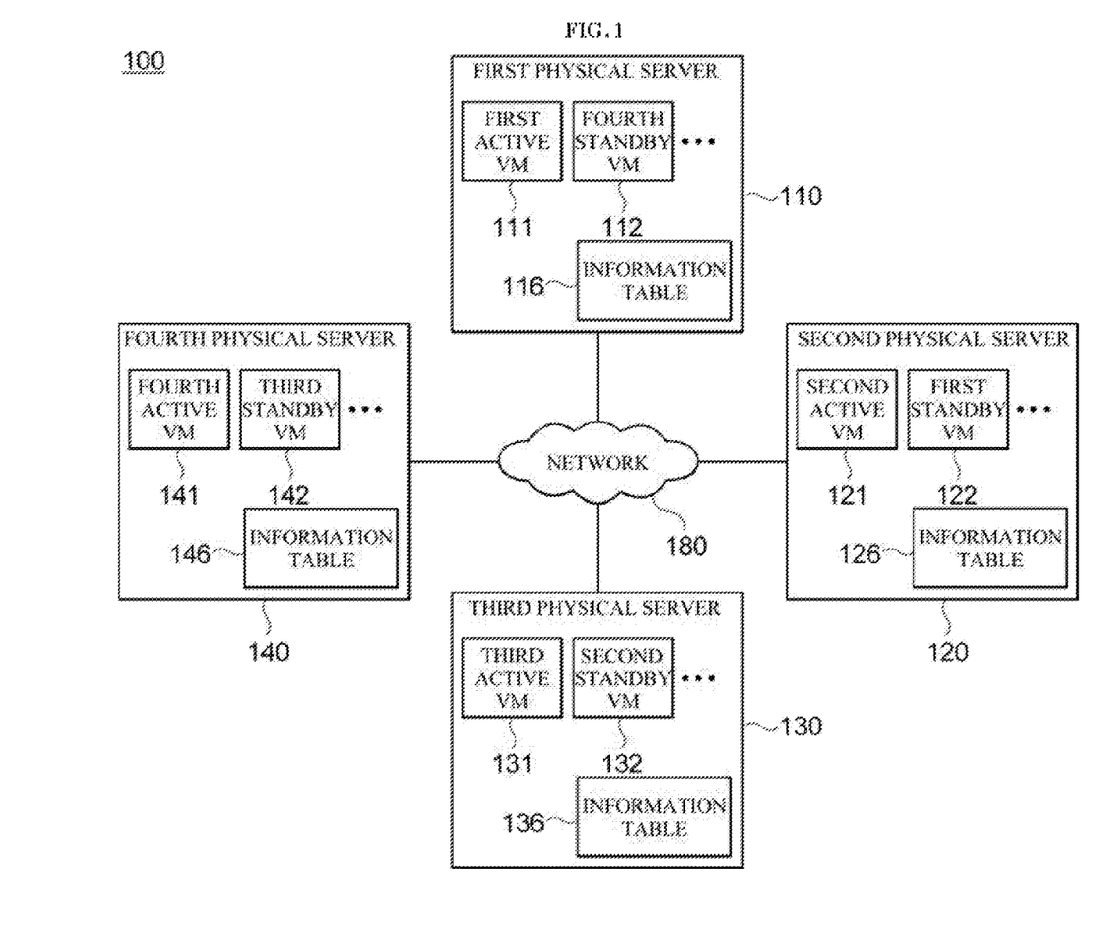
FIG. 1 shows a cluster system including a plurality of server computers according to an exemplary embodiment.

FIG. 1 shows a cluster system including a plurality of server computers according to an exemplary embodiment.

As shown in FIG. 1, an exemplary cluster system 100 includes a first physical server 110, a second physical server 120, a third physical server 130, and a fourth physical server 140. The physical servers 110, 120, 130, and 140 are communicatively connected to one another through a network 180. For example, the physical servers 110, 120, 130, and 140 may exchange, through the network 108, signals (e.g., heartbeat signals) indicative of their respective states. The network 180 may be a ring network, a star network, a bus network, a mesh network, or a tree network, but these topologies are merely illustrative.

Each of the physical servers 110, 120, 130, and 140 is a computing device, including hardware such as one or more processors, one or more memories, one or more storage devices (e.g., a hard drive), one or more network interfaces, and one or more input/output adaptors. The memory may include computer-executable instructions, and the processor may execute the instructions stored in the memory. When the instructions stored in the memory are executed by the processor, the instructions may perform operations according to an exemplary embodiment as described below.

Each of the physical servers 110, 120, 130, and 140 may provide a virtualized environment. For example, a virtual machine (VM) may be registered in each of the physical servers 110, 120, 130, and 140. The registered virtual machine may be allocated a resource such as a virtualized CPU, a virtualized memory, or the like. In addition, each of the physical servers 110, 120, 130, and 140 includes software, firmware, and/or operating system components for executing the virtual machine. Accordingly, the virtual machine stored in the memory of each of the physical servers 110, 120, 130, and 140 may be executed.

According to a certain exemplary embodiment, the cluster system 100 provides, based on the virtualized environment, a high level of service availability. As shown in FIG. 1, the physical servers 110, 120, 130, and 140 being in normal operation in the cluster system 100 include active virtual machines 111, 121, 131, and 141, respectively. For example, since it is possible to back up the active virtual machines 111, 121, 131, and 141 by replicating/mirroring the active virtual machines 111, 121, 131, and 141 to their respective standby virtual machines 112, 122, 132, and 142, the active virtual machines 111, 121, 131, and 141 and the standby virtual machines 112, 122, 132, and 142 may be synchronized. Each of the standby virtual machines 112, 122, 132, and 142, which corresponds to a respective one of the active virtual machines 111, 121, 131, and 141, is located in a physical server different from the physical server including the respective one of the active virtual machines 111, 121, 131, and 141. By way of example, the first standby virtual machine 122 corresponding to the first active virtual machine 111 of the first physical server 110 is included in the second physical server 120.

Each of the physical servers 110, 120, 130, or 140 may have stored therein registration information indicating the virtual machines included in the physical servers 110, 120, 130, and 140. In other words, the virtual machines registered in the physical server 110, 120, 130, or 140 are indicated in the registration information. Accordingly, the registration information may be used for checking which virtual machine is registered in a physical server in the cluster system 100 or checking which physical server in the cluster system 100 has registered therein a virtual machine.

In another aspect, the registration information may be used for adding another virtual machine to the physical server 110, 120, 130, or 140 or removing an existing virtual machine from the physical server 110, 120, 130, or 140. For example, after the registration information of each of the physical server 110, 120, 130, and 140 is changed/updated, at least one of the physical servers 110, 120, 130, and 140 may register, in itself, a virtual machine that has not been registered therein, in accordance with such registration information.

The registration information included in each of the physical server 110, 120, 130, and 140 may have a form of a table. According to FIG. 1, the physical servers 110, 120, 130, and 140 include information tables 116, 126, 136, and 146, respectively. The information tables 116, 126, 136, and 146 may be configured to include the same information.

Figure 2:
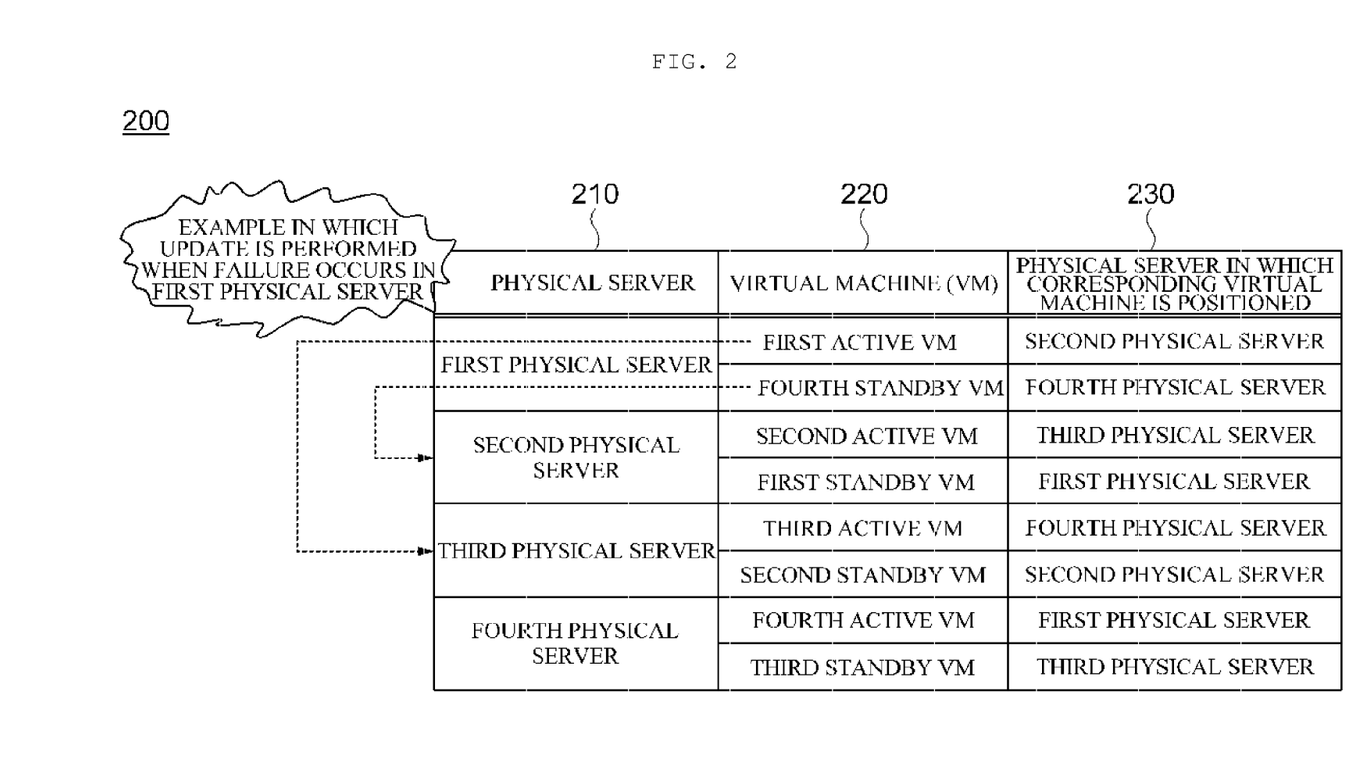
FIG. 2 shows an example of an information table included in a physical server according to an exemplary embodiment.

FIG. 2 shows an example of an information table included in a physical server according to an exemplary embodiment.

An exemplary information table 200 includes information 210 for identifying physical servers and information 220 for identifying virtual machines included in each physical server. The information table 200 may further include information 230 for identifying physical servers in which a virtual machine which is identified by the information 220 is positioned.

For example, the information table 200 may be configured as follows. The following illustrative information table 200 may be used as the information tables 116, 126, 136, and 146 which are included in the physical servers 110, 120, 130, and 140 in the cluster system 100 shown in FIG. 1.

The information 210 (i.e., the column entitled "PHYSICAL SERVER") indicates the first physical server 110, the second physical server 120, the third physical server 130, and the fourth physical server 140 in the cluster system 100.

The information 220 (i.e., the column entitled "VIRTUAL MACHINE (VM)") indicates virtual machines registered in the physical servers identified by the information 210. Specifically, the information 220 indicates the first active virtual machine 111 and the fourth standby virtual machine 112 in association with the first physical server 110, indicates the second active virtual machine 121 and the first standby virtual machine 122 in association with the second physical server 120, indicates the third active virtual machine 131 and the second standby virtual machine 132 in association with the third physical server 130, and indicates the fourth active virtual machine 141 and the third standby virtual machine 142 in association with the fourth physical server 140.

The information 230 (i.e., the column entitled "PHYSICAL SERVER IN WHICH CORRESPONDING VIRTUAL MACHINE IS POSITIONED") indicates a physical server including a virtual machine corresponding to a virtual machine indicated by the information 220. For example, since the first standby virtual machine 122 synchronized with the first active virtual machine 111 is included in the second physical server 120, the information 230 indicates the second physical server 120 in association with the first active virtual machine 111. As another example, since the fourth active virtual machine 141 synchronized with the fourth standby virtual machine 112 is included in the fourth physical server 140, the information 230 indicates the fourth physical server 140 in association with the fourth standby virtual machine 112. In this manner, the information 230 indicates a certain physical server in association with a virtual machine indicated in the information 220.

Additionally, the information table 200 may include information (not shown) indicating an available resource of a physical server indicated by the information 210. For example, an available resource of a certain physical server may include an available CPU and/or memory of the physical server.

The information table 200 may be changed. When the information table 200 is changed, at least one of the physical servers 110, 120, 130, and 140 may register, in itself, a virtual machine that has not been previously registered therein, according to the changed information table 200.

The information table 200 may be generated and/or changed at one of the first physical server 110, the second physical server 120, the third physical server 130, and the fourth physical server 140 and then be provided to the others. The physical server that generates and/or changes the information table 200 may be altered dynamically. For example, when the first physical server 110 is responsible for changing the information table 200, but there occurs a failure in the first physical server 110, at least another physical server (e.g., the second physical server 120) may take responsibility for changing the information table 200. Alternatively, each of the physical servers 110, 120, 130, and 140 may separately generate and/or change the information table 200.

In addition, for example, the generated information table 200 may be changed based on a state of each of the physical servers 110, 120, 130, and 140, as shown in FIG. 2. Information indicating the state of each physical server 110, 120, 130, or 140 may be included in a signal that is transmitted by the physical server 110, 120, 130, or 140 (e.g., a heartbeat signal that the physical server 110, 120, 130, or 140 may periodically transmit). For example, it is assumed that the first physical server 110 is responsible for changing the information table 200. Each of the second physical server 120, the third physical server 130, and the fourth physical server 140 may transmit a heartbeat signal. The first physical server 110 may change, based on its own state and the states of the physical servers included in the respective heartbeat signals, the information table 200 such that virtual machines included in all or some of the physical servers 110, 120, 130, and 140 may be redistributed. Furthermore, each of the second physical server 120, the third physical server 130, and the fourth physical server 140 may transmit information on its own available resources in addition to its heartbeat signal. In this case, the first physical server 110 may change the information table 200 based on available-resource information of each of the physical servers 110, 120, 130, and 140.

A time point at which the information table 200 is changed may be determined according to a predetermined policy. For example, the information table 200 may be changed when an amount of variation in at least one of available resources of the physical servers 110, 120, 130, and 140 is greater than a threshold (e.g., 10% of existing available resources), and this may prevent an overhead caused by excessively frequent updating of the information table 200.

Now with reference back to FIG. 1, the following illustration provides a technique for providing service availability when a failure occurs in a certain physical server in the cluster system 100.

In the following example, a failure occurs in the first physical server 110 in which the first active virtual machine 111 is registered. It is assumed that prior to the occurrence of the failure, the information tables 116, 126, 136, and 146 respectively stored in the physical servers 110, 120, 130, and 140 include the information table 200 shown in FIG. 2.

When a failure occurs in the first physical server 110, the first active virtual machine 111 fails over to the first standby virtual machine 122. The failover may be initiated with reference to the information tables 116, 126, 136, and 146. According to the information tables 116, 126, 136, and 146, the first standby virtual machine 122 corresponding to the first active virtual machine 111 is registered in the second physical server 120 in the cluster system 100. For example, when the second physical server 120 detects that the first physical server 110 has not responded to a heartbeat signal transmitted from the second physical server 120, it may be determined that a failure has occurred in the first physical server 110. In addition, the second physical server 120 allows the first active virtual machine 111 to fail over to the first standby virtual machine 122, with reference to its own information table 126.

When, as described above, the first standby virtual machine 122 performs a failover of the first active virtual machine 111, the first standby virtual machine 122 takes over and resumes the service that has been provided from the first active virtual machine 111.

In addition, when a failure occurs in the first physical server 110, the information table 200 is updated/reconfigured. Such update is performed to properly redistribute virtual machines registered in the first physical server 110 to the remaining physical servers 120, 130, and 140. After the first standby virtual machine 122 performs a failover, at least one of the physical servers 120, 130, and 140 other than the first physical server 110 in which the failure has occurred may update the information table 200. Such update may be based on logic that configures registration information such that any active virtual machine and its corresponding standby virtual machine are not registered in the same physical server.

As an example, the updated information table 200 associates the first active virtual machine 111 with one of the remaining physical servers 120, 130, and 140. However, the physical server associated with the first active virtual machine 111 is different from the second physical server 120. For example, according to the updated information table 200, the third physical server 130 is associated with the first active virtual machine 111. In addition, the updated information table 200 associates the fourth standby virtual machine 112 registered in the first physical server 110 with one of the remaining physical servers 120, 130, and 140. However, the physical server associated with the fourth standby virtual machine 112 is different from the fourth physical server 140 in which the fourth active virtual machine 141 corresponding to the fourth standby virtual machine 112 is registered. For example, according to the updated information table 200, the third physical server 130 is associated with the first active virtual machine 111.

Furthermore, for the updating of the information table 200, the physical server associated with the first active virtual machine 111 and the physical server associated with the fourth standby virtual machine 112 may be selected based on available resources of some of the physical servers 110, 120, 130, and 140. Specifically, the physical server associated with the first active virtual machine 111 may be selected from between the physical servers 130 and 140 based on an available resource of each of the physical servers 130 and 140 other than the first physical server 110 which has failed and the second physical server 120 which has the first standby virtual machine 122 to which the first active virtual machine 111 fails over. For example, if the third physical server 130 includes available resources more sufficient than those of the fourth physical server 140, the first active virtual machine 111 is associated with the third physical server 130. The physical server associated with the fourth standby virtual machine 112 may be selected from between the physical servers 120 and 130 based on an available resource of each of the physical servers 120 and 130 other than the first physical server 110 which has failed and the fourth physical server 140 which has registered therein the fourth active virtual machine 141. For example, if the second physical server 120 includes available resources more sufficient than those of the third physical server 130, the fourth standby virtual machine 112 is associated with the second physical server 120.

In a nutshell, as a result of the above updating, the information table 200 shown in FIG. 2 indicates, as virtual machines corresponding to the second physical server 120, the fourth standby virtual machine 112 in addition to the second active virtual machine 121 and the first standby virtual machine 122, and indicates, as virtual machines corresponding to the third physical server 130, the first active virtual machine 111 in addition to the third active virtual machine 131 and the second standby virtual machine 132. The updated information table 200 indicates, as virtual machines corresponding to the fourth physical server 140, the same as before the updating, i.e., the fourth active virtual machine 141 and the third standby virtual machine 142.

According to the updated information table 200, the first active virtual machine 111 and the fourth standby virtual machine 112 that have been registered in the first physical server 110 in which a failure has occurred are registered in different physical servers. In the foregoing example, the first active virtual machine 111 is registered in the third physical server 130, and the fourth standby virtual machine 112 is registered in the second physical server 120. Such registration may involve copying an on-memory snapshot or a corresponding virtual machine of each of the first active virtual machine 111 and the fourth standby virtual machine 112, where the snapshot or the virtual machine is made before the failure occurs in the first physical server 110. For example, the registration of the first active virtual machine 111 in the third physical server 130 may involve retrieving a final snapshot of the first active virtual machine 111 from a shared memory or mirroring the first standby virtual machine 122 included in a memory of the second physical server 120.

Figure 3:
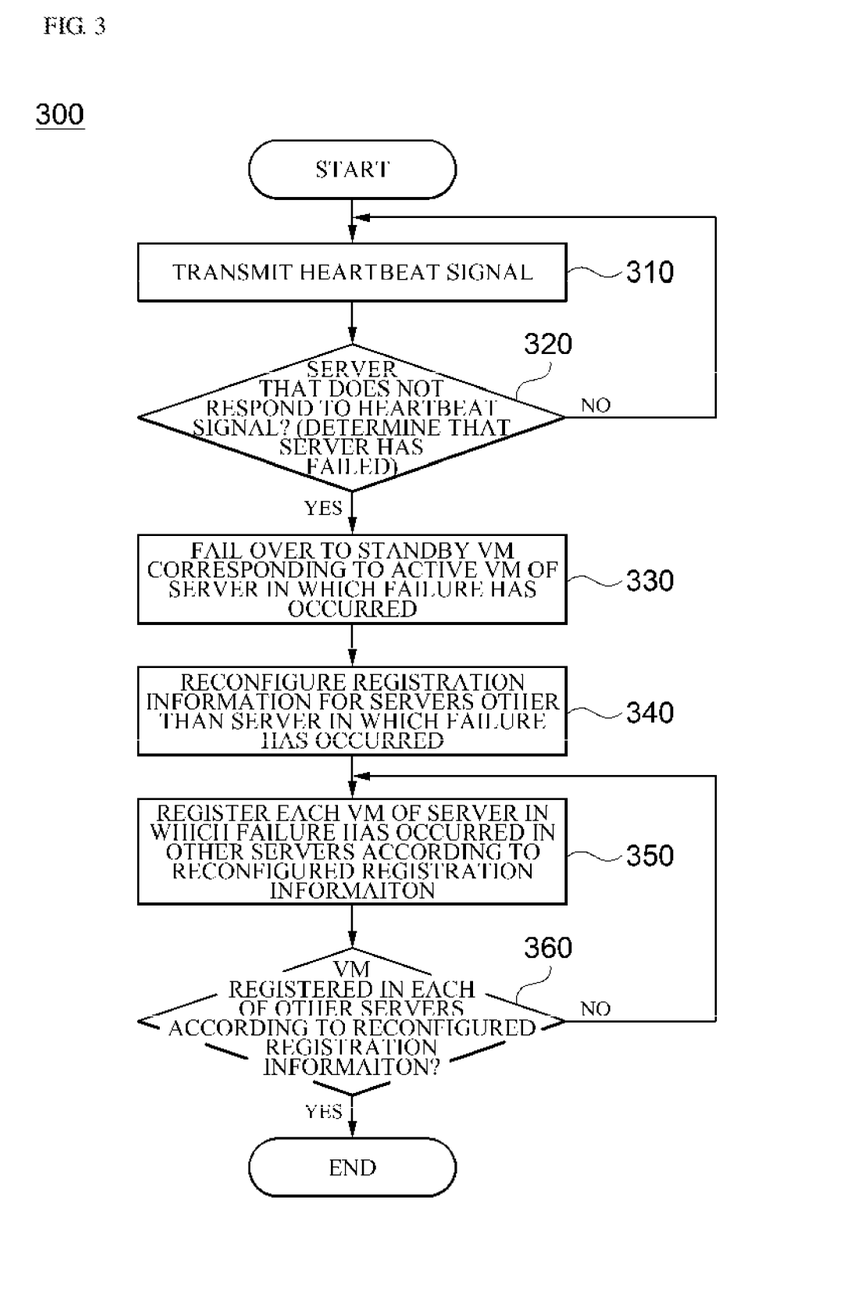
FIG. 3 is a flowchart showing a process of providing service availability in a cluster system according to an exemplary embodiment.

FIG. 3 is a flowchart showing a process of providing service availability in a cluster system according to an exemplary embodiment.

When an exemplary process 300 for providing service availability is initiated, the physical servers 110, 120, 130, and 140 in the cluster system 100 periodically transmit their respective heartbeat signals indicating their respective states (310). The registration information indicating the virtual machines registered in each of the physical servers 110, 120, 130, and 140 may be included in each of the physical servers 110, 120, 130, and 140. The registration information may have the same format as the above-described information table 200.

When each of the physical servers 110, 120, 130, and 140 responds to the received heartbeat signals (320), the physical servers 110, 120, 130, and 140 continue to transmit the heartbeat signals (310).

When there is a physical server that does not respond to the received heartbeat signals (320), it may be determined that a failure has occurred in the physical server. In this case, a standby virtual machine which is registered in another physical server and which corresponds to an active virtual machine registered in the physical server where the failure has occurred performs a failover (330). For example, in response to determining that the failure has occurred in the first physical server 110, the second physical server 120 allows the first active virtual machine 111 to fail over to the first standby virtual machine 122 which corresponds to the first active virtual machine 111 and which is registered in the second physical server 120.

After the failover, the registration information is reconfigured with respect to the physical servers other than the physical server in which the failure has occurred (340). Such reconfiguration may be based on logic that prevents an active virtual machine and its corresponding standby virtual machine from being registered in an identical physical server and also allows a physical server having sufficient available resources to preferentially register virtual machines of the physical server which has failed. For convenience, registration information before the failure occurrence is referred to as pre-failure registration information, and registration information reconfigured and/or updated after the failure occurrence is referred to as post-failure registration information.

For example, when a failure occurs in the first physical server 110, the post-failure registration information associates the first active virtual machine 111 of the first physical server 100 with one of the other physical servers and associates the fourth standby virtual machine 112 of the first physical server 110 with another one of the other physical servers. However, the physical server associated with the first active virtual machine 111 is different from the second physical server 120 in which the first standby virtual machine 122, to which the first active virtual machine 111 fails over, is registered, and the physical server associated with the fourth standby virtual machine 112 is different from the fourth physical server 140 in which the fourth active virtual machine 141 corresponding to the fourth standby virtual machine 112 is registered. As described above, physical servers to be associated with the virtual machines 111 and 112 of the first physical server 110 which has failed may be selected based on available resources of some of the physical servers 120, 130, and 140 so that the post-failure registration information may be configured.

The post-failure registration information is stored in each of the second physical server 120, the third physical server 130, and the fourth physical server 140. When the first physical server 110 operates normally again after the failure occurrence, the first physical server 110 may also have stored therein the post-failure registration information (or, if the post-failure registration information is dynamically changed, the dynamically changed registration information).

According to the post-failure registration information (that is, the reconfigured registration information), each virtual machine of the physical server which has failed is registered in a different physical server (350). If, according to the reconfigured registration information, there remains a virtual machine that is not yet registered in a physical server other than the physical server in which the failure has occurred (360), the virtual machine is registered in that physical server (350). When the virtual machines have been registered in their corresponding physical servers according to the reconfigured registration information (350), the process 300 is terminated.

According to exemplary embodiments, a cluster system including a plurality of physical servers may provide a higher level of service availability, thereby minimizing downtime of a service when there occurs a failure in a physical server in the cluster system.

In addition, an exemplary embodiment of the present disclosure can include a computer-readable storage medium including a program for performing the methods described herein on a computer. The computer-readable storage medium may separately include program commands, local data files, local data structures, etc. or include a combination of them. The computer-readable storage medium may be specially designed and configured for the present disclosure, or known and available to those of ordinary skill in the field of computer software. Examples of the computer-readable storage medium include magnetic media, such as a hard disk, a floppy disk, and a magnetic tape, optical recording media, such as a CD-ROM and a DVD, magneto-optical media, such as a floptical disk, and hardware devices, such as a ROM, a RAM, and a flash memory, specially configured to store and execute program commands. Examples of the program commands may include high-level language codes executable by a computer using an interpreter, etc., as well as machine language codes made by compilers.

It will be apparent to those familiar with this field that various modifications can be made to the above-described exemplary embodiments of the present disclosure without departing from the spirit or scope of the present disclosure. Thus, it is intended that the present disclosure covers all such modifications provided they come within the scope of the appended claims and their equivalents.

What is claimed is:

1. A cluster system comprising:
a first physical server having registered therein an active virtual machine; and
a plurality of physical servers,
wherein the plurality of physical servers comprises a second physical server having registered therein a standby virtual machine corresponding to the active virtual machine, the active virtual machine failing over to the standby virtual machine when a failure occurs in the first physical server, wherein each of the plurality of physical servers stores post-failure registration information when the failure occurs, wherein the post-failure registration information associates the active virtual machine with a physical server among the plurality of physical servers, and wherein the physical server is different from the second physical server, and
wherein the post-failure registration information associates another standby virtual machine registered in the first physical server with another physical server among the plurality of physical servers, and wherein said another physical server is different from a physical server having registered therein another active virtual machine corresponding to said another standby virtual machine.

2. The cluster system of claim 1, wherein, based on an available resource of each of physical servers which are different from the second physical server and are included in the plurality of physical servers, the physical server is selected from among the physical servers different from the second physical server for configuration of the post-failure registration information.

3. The cluster system of claim 1, wherein the active virtual machine is registered in the physical server according to the post-failure registration information.

4. The cluster system of claim 1, wherein, based on an available resource of each of physical servers which are different from the physical server having registered therein said another active virtual machine and are included in the plurality of physical server, said another physical server is selected from among the physical servers different from the physical server having registered therein said another active virtual machine for configuration of the post-failure registration information.

5. The cluster system of claim 1, wherein said another standby virtual machine is registered in said another physical server according to the post-failure registration information.

6. The cluster system of claim 1, wherein each of the first physical server and the plurality of physical servers stores pre-failure registration information before the failure occurs, wherein the post-failure registration information is configured by updating of the pre-failure registration information, and wherein the pre-failure registration information indicates a virtual machine which is registered in each of the first physical server and the plurality of physical servers before the failure occurs.

7. The cluster system of claim 6, wherein, before the failure occurs, the pre-failure registration information is changeable based on a state of each of the first physical server and the plurality of physical servers.

8. The cluster system of claim 6, wherein the pre-failure registration information further indicates an available resource of the first physical server and an available resource of each of the plurality of physical servers.

9. The cluster system of claim 7, wherein the pre-failure registration information is changed when an amount of variation in at least one of the available resource of the first physical server and the available resource of each of the plurality of physical servers is greater than a threshold.

10. A method of providing service availability in a cluster system, the method comprising:
when a failure occurs in a first physical server having registered therein an active virtual machine, allowing the active virtual machine to fail over to a standby virtual machine corresponding to the active virtual machine, the standby virtual machine being registered in a second physical server among a plurality of physical servers; and
when the failure occurs, storing post-failure registration information in each of the plurality of physical servers, wherein the post-failure registration information associates the active virtual machine with a physical server among the plurality of physical servers, and wherein the physical server is different from the second physical server, and
wherein the post-failure registration information associates another standby virtual machine registered in the first physical server with another physical server among the plurality of physical servers, and wherein said another physical server is different from a physical server having registered therein another active virtual machine corresponding to said another standby virtual machine.

11. The method of claim 10, further comprising selecting, based on an available resource of each of physical servers which are different from the second physical server and are included in the plurality of physical servers, the physical server from among the physical servers different from the second physical server for configuration of the post-failure registration information.

12. The method of claim 10, further comprising registering the active virtual machine in the physical server according to the post-failure registration information.

13. The method of claim 10, further comprising selecting, based on an available resource of each of physical servers which are different from the physical server having registered therein said another active virtual machine and are included in the plurality of physical server, said another physical server from among the physical servers different from the physical server having registered therein said another active virtual machine for configuration of the post-failure registration information.

14. The method of claim 10, further comprising registering said another standby virtual machine in said another physical server according to the post-failure registration information.

15. The method of claim 10, further comprising:
storing pre-failure registration information in each of the first physical server and the plurality of physical servers before the failure occurs; and
configuring the post-failure registration information by updating the pre-failure registration information,
wherein the pre-failure registration information indicates a virtual machine which is registered in each of the first physical server and the plurality of physical servers before the failure occurs.

16. The method of claim 15, further comprising changing, before the failure occurs, the pre-failure registration information based on a state of each of the first physical server and the plurality of physical servers.

17. The method of claim 15, wherein the pre-failure registration information further indicates an available resource of the first physical server and an available resource of each of the plurality of physical servers.

18. The method of claim 16, wherein the pre-failure registration information is changed when an amount of variation in at least one of the available resource of the first physical server and the available resource of each of the plurality of physical servers is greater than a threshold.

19. A server computer comprising:
a processor; and
a memory,
wherein the memory includes:
registration information indicating a virtual machine registered in each of another server computer and a plurality of server computers including the server computer;
a standby virtual machine corresponding to an active virtual machine registered in said another server computer; and
computer-executable instructions configured to, when executed by the processor, perform:
an operation of allowing, in response to determining that a failure has occurred in said another server computer, the active virtual machine to fail over to the standby virtual machine; and
an operation of updating the registration information in response to the determination, and
wherein the updated registration information associates the active virtual machine with one of the plurality of server computers, and wherein said one of the plurality of server computers is different from the server computer, and
wherein said another server computer has registered therein another standby virtual machine, wherein the updated registration information associates said another standby virtual machine with another one of the plurality of server computers, and wherein said another one of the plurality of server computers is different from a server computer having registered therein another active virtual machine corresponding to said another standby virtual machine.

20. The server computer of claim 19, wherein the computer-executable instructions are further configured to, when executed by the processor, perform an operation of selecting, based on an available resource of each of server computers which are different from the server computer and are included in the plurality of server computers, said one of the plurality of server computers from among the server computers different from the server computer for updating of the registration information.

21. The server computer of claim 19, wherein the computer-executable instructions are further configured to, when executed by the processor, perform an operation of selecting, based on an available resource of each of server computers which are different from the server computer having registered therein said another active virtual machine and are included in the plurality of server computers, said another server computer from among the server computers different from the server computer having registered therein said another active virtual machine for updating of the registration information.

22. The server computer of claim 19, wherein the computer-executable instructions are further configured to, when executed by the processor, perform an operation of changing, before the failure occurs, the registration information based on a state of each of the plurality of server computers and a state of said another server computer.

23. The server computer of claim 19, wherein the registration information further indicates an available resource of said another server computer and an available resource of each of the plurality of server computers.

24. The server computer of claim 22, wherein the operation of changing the registration information is performed when an amount of variation in at least one of the available resource of each of the plurality of server computers and the available resource of said another server computer is greater than a threshold.

* * * * *